US012589402B2

(12) United States Patent
Kim et al.

(10) Patent No.: US 12,589,402 B2
(45) Date of Patent: Mar. 31, 2026

(54) PATTERN FORMING APPARATUS

(71) Applicants: Hanbat National University Industry-Academic Cooperation Foundation, Daejeon (KR); TOKYO INSTITUTE OF TECHNOLOGY, Tokyo (JP)

(72) Inventors: Joon-wan Kim, Kanagawa (KR); Dong Soo Kim, Daejeon (KR); Min Hun Jung, Jeollanam-do (KR); Hyun Ah Lee, Sejong-si (KR)

(73) Assignees: Hanbat National University Industry-Academic Cooperation Foundation, Daejeon (KR); Tokyo Institute of Technology, Tokyo (JP)

( * ) Notice: Subject to any disclaimer, the term of this patent is extended or adjusted under 35 U.S.C. 154(b) by 454 days.

(21) Appl. No.: 18/159,267

(22) Filed: Jan. 25, 2023

(65) Prior Publication Data

US 2023/0241637 A1 Aug. 3, 2023

(30) Foreign Application Priority Data

Jan. 28, 2022 (JP) ................................ 2022-012091
Apr. 12, 2022 (KR) ........................ 10-2022-0045314

(51) Int. Cl.
*B05B 12/22* (2018.01)
*B05B 5/08* (2006.01)

(52) U.S. Cl.
CPC .............. *B05B 12/22* (2018.02); *B05B 5/082* (2013.01)

(58) Field of Classification Search
USPC ...... 118/620–640, 401, 504, 505; 435/283.1, 435/287.2
See application file for complete search history.

(56) References Cited

U.S. PATENT DOCUMENTS

| | | | | |
|---|---|---|---|---|
| 6,350,609 | B1 * | 2/2002 | Morozov | B05B 5/0255 422/50 |
| 7,150,859 | B2 | 12/2006 | Yamagata et al. | |
| 10,892,415 | B2 | 1/2021 | Nishida et al. | |

FOREIGN PATENT DOCUMENTS

| | | | | |
|---|---|---|---|---|
| JP | 2001281252 | A * | 10/2001 | B01J 19/0046 |
| JP | 2004-145032 | A | 5/2004 | |
| JP | 2007305507 | A | 11/2007 | |
| JP | 2011-175921 | A | 9/2011 | |
| JP | 2018-193618 | A | 12/2018 | |
| KR | 10-2016-0015392 | A | 2/2016 | |

OTHER PUBLICATIONS

English Translation JP-2001081252A (Year: 2001).*

(Continued)

*Primary Examiner* — Yewebdar T Tadesse
(74) *Attorney, Agent, or Firm* — Blank Rome LLP

(57) ABSTRACT

Provided is a pattern forming apparatus which may form a pattern on a substrate with high precision by using a material including an organic material, the pattern forming apparatus including: a capillary facing a grounded substrate and capable of storing a solution including a sample; a power source applying a voltage to the capillary; a stencil mask disposed between the capillary and the substrate, and including an opening through which the sample passes; and a cross-direction actuator moving the stencil mask in a cross direction crossing a direction in which the sample passes.

6 Claims, 7 Drawing Sheets

(56) References Cited

OTHER PUBLICATIONS

Joon-Wan Kim et al., "Micropatterning by electrospray deposition (ESD) with an electrostatic lens", Tokyo Institute of Technology, J1120203, No. 18-1, 2018.
Karolina Laszczyk et al., "A two directional electrostatic comb-drive X—Y micro-stage for MOEMS applications", Sensors and Actuators A 163 (2010) 255-265.
Office Action issued in corresponding Korean Patent Application No. 10-2022-0045314 dated May 9, 2023.

* cited by examiner

[FIG. 1]
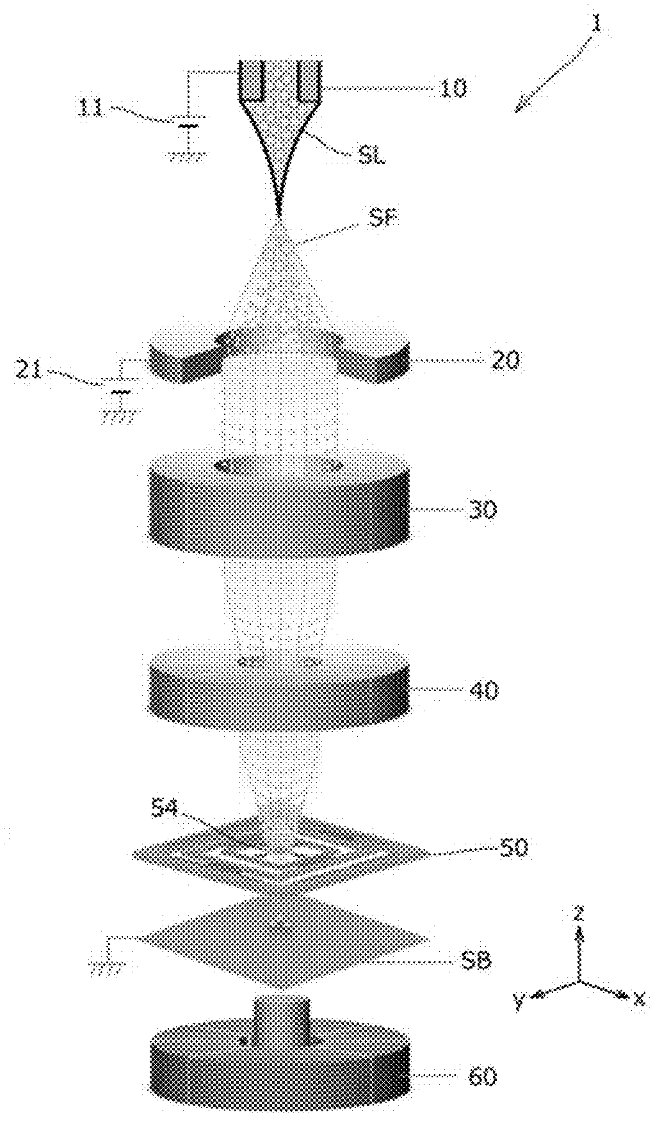

[FIG. 2]
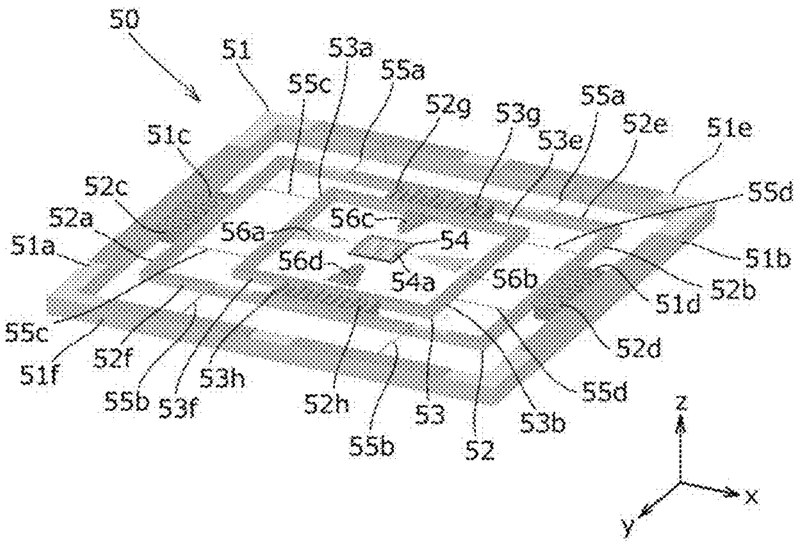

[FIG. 3]
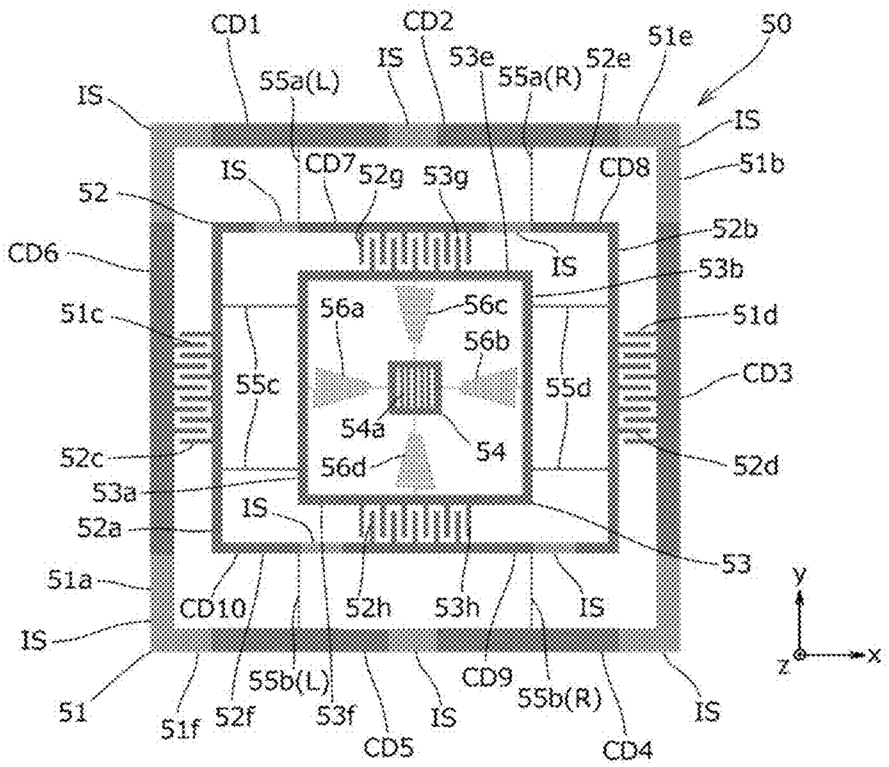

[FIG. 4]
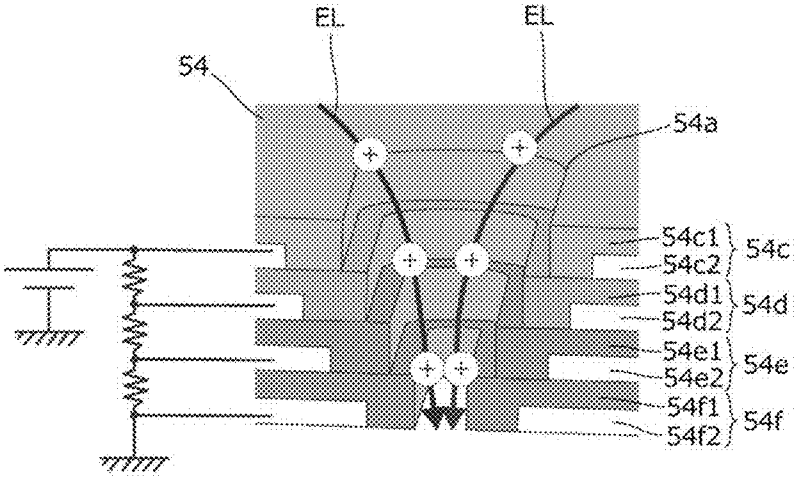

[FIG.5]
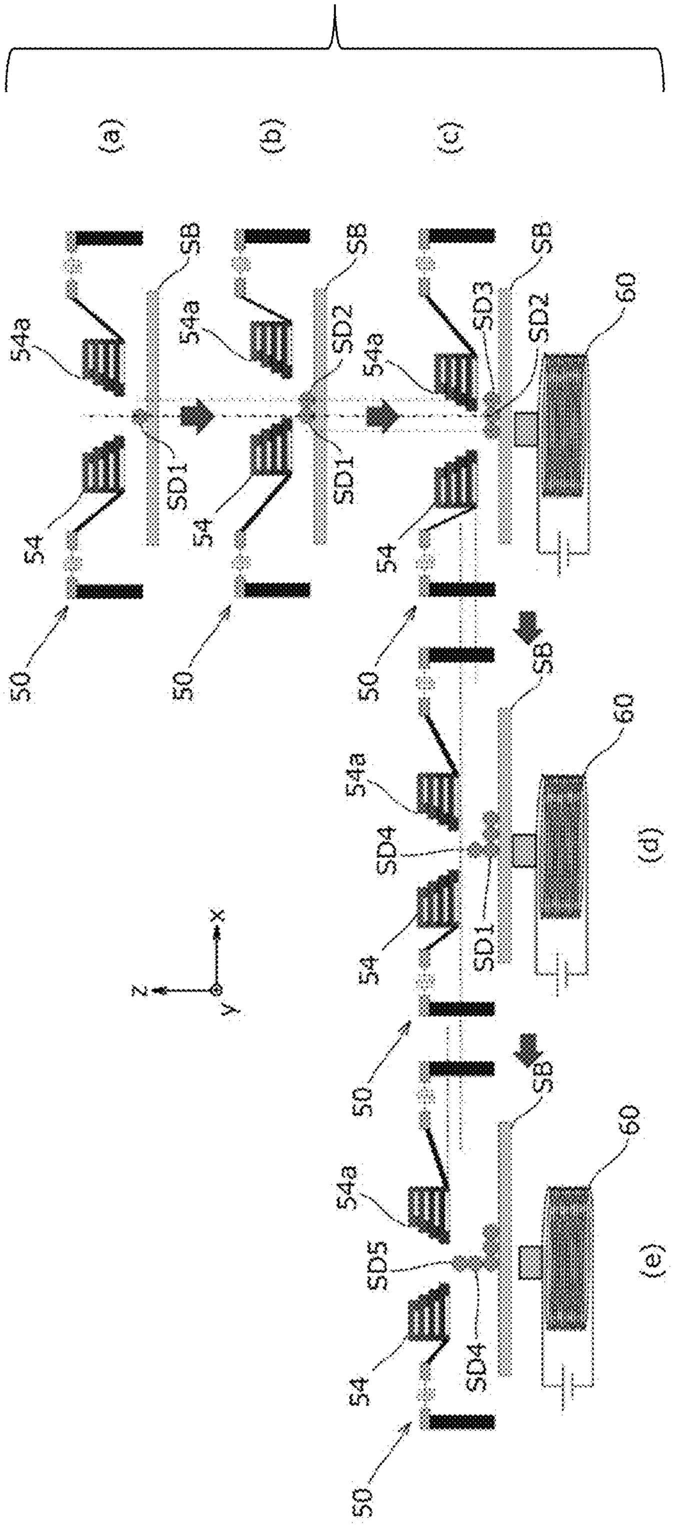

[FIG. 6]
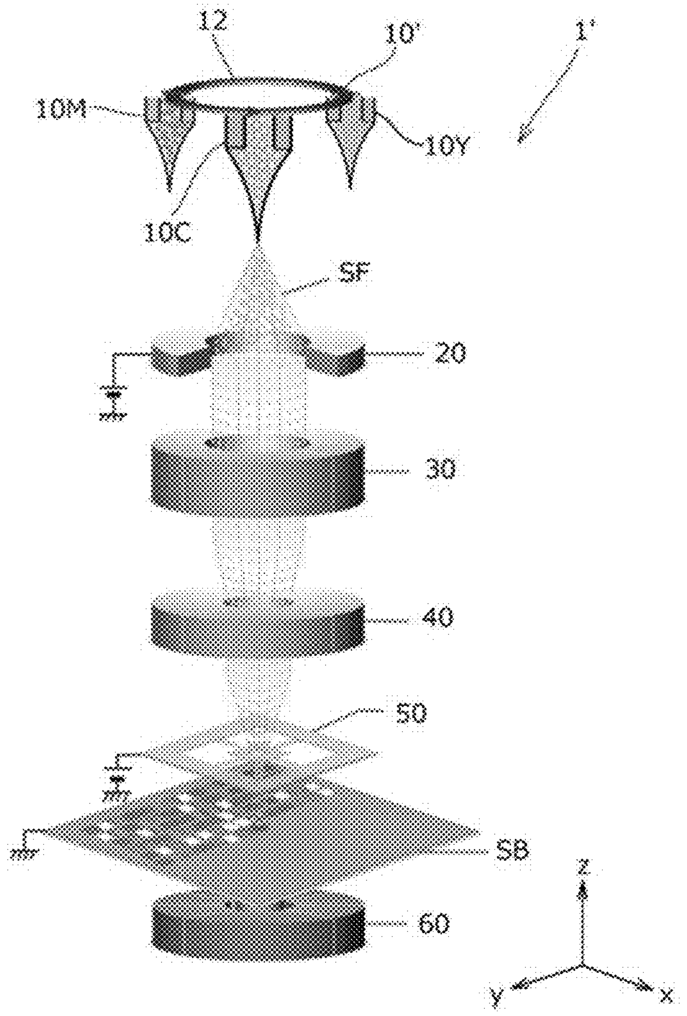

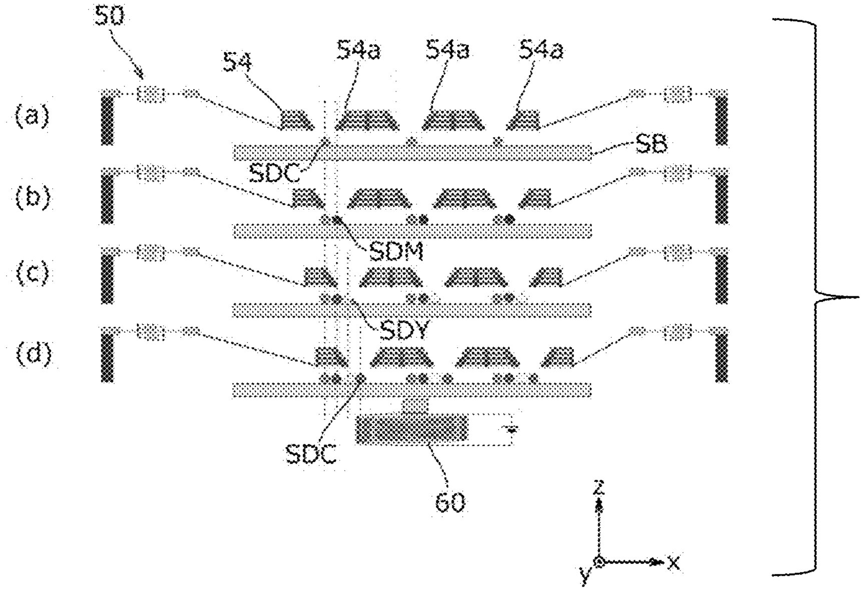
[FIG.7]

PATTERN FORMING APPARATUS

CROSS-REFERENCE TO RELATED APPLICATIONS

This application claims priority under 35 U.S.C. § 119 to Korean Patent Application No. 10-2022-0045314, filed on Apr. 12, 2022, in the Korean Intellectual Property Office and Japanese Patent Application No. 2022-012091, filed on Jan. 28, 2022, in the Japanese Intellectual Property Office, the disclosure of which is incorporated herein by reference in its entirety.

TECHNICAL FIELD

The following disclosure relates to a pattern forming apparatus.

BACKGROUND

For example, in a field of semiconductor manufacturing technology, technology for patterning a thin film of an inorganic material such as a metal, oxide, or nitride, mainly by a masking method using a photoresist, has been developed, and forming a pattern having a line width of 100 nm or less has already been put into practical use. Mainstream methods used for the patterning may include formation of a thin film material by vacuum deposition (e.g., resistance heating method, electron beam method, or sputtering) and (dry or wet) etching by the photoresist with a pattern formed thereon.

Meanwhile, the field of semiconductor manufacturing technology cannot directly and exclusively use a micro-patterning method using a material other than the inorganic material such as a synthetic organic polymer, an organic material, or a biopolymer (e.g., protein or DNA). In general, such a material may be weak to heat or vacuum, and thus cannot be used in the method such as vacuum deposition, and in many cases, peeling of a masking material may become impossible when the masking material such as the photoresist is applied on an upper surface of the material.

In addition, among the materials other than the inorganic materials, there are many materials that are modified by a strong chemical reaction such as the etching, regardless of whether the dry etching or the wet etching is used. For this reason, a method such as screen printing, spotting, or contact printing has been used for patterning the organic material or the biopolymer. However, it is difficult to form a micro-pattern or nano-pattern with high precision by using this method.

In this regard, Patent Document 1 proposes a method of manufacturing an organic electroluminescent (EL) element that forms a pattern having a desired function by attaching a sample solution to a conductive pattern located on a conductive substrate by using an electrospray deposition method.

RELATED ART DOCUMENT

Patent Document (Patent Document 1) Japanese Patent Laid-Open Publication No. 2007-305507.

Non-Patent Document

Non-Patent Document 1: "MICRO-PATTERNING BY ELECTROSPRAY DEPOSITION (ESD) METHOD USING ELECTROSTATIC LENS," Joon-Wan Kim and 4 others, 2018 Proceedings of Lectures at Annual Conference of Japan Society of Mechanical Engineers, Japan Society of Mechanical Engineers.

SUMMARY

In particular, micro-patterning of the material may be achieved in a wide range and with high precision by a method combining a stencil mask with an electrospray deposition method. A material solution electrically sprayed by the electrospray deposition method may be instantly dried in air, and the material may thus be dried and then deposited on a substrate. It is thus theoretically possible to form a pattern having a particle diameter of several tens of nm.

However, it is difficult to perform nano-machining of holes on a conventional stencil mask, and particles are also highly likely to block the hole, thus hindering nano-scale patterning.

In this regard, as shown in Non-Patent Document 1, proposed is a novel stencil mask capable of actively controlling a particle trajectory by changing an electric field between a capillary into which the material solution is put and the substrate. The particles may be deposited on the substrate at a nano-scale without clogging by using this novel stencil mask.

However, it is impossible to form a pattern having a complex shape only by depositing the particles on the substrate at the nano-scale.

Embodiments of the present disclosure are directed to providing a pattern forming apparatus which may form a pattern on a substrate with high precision by using a material including an organic material.

In one general aspect, a pattern forming apparatus of the present disclosure includes: a capillary facing a grounded substrate and capable of storing a solution including a sample; a power source applying a voltage to the capillary; a stencil mask disposed between the capillary and the substrate, and including an opening through which the sample passes; and a cross-direction actuator moving the stencil mask in a cross direction crossing a direction in which the sample passes.

Other features and aspects will be apparent from the following detailed description, the drawings, and the claims.

According to the present disclosure, it is possible to provide the pattern forming apparatus which may form a pattern on the substrate with the high precision by using the material including the organic material.

Tasks, configurations, and effects other than the above are made clear by description of the embodiments below.

BRIEF DESCRIPTION OF THE DRAWINGS

FIG. 1 is a schematic view of a pattern forming apparatus 1 according to a first embodiment.

FIG. 2 is a perspective view of an xyz stage.

FIG. 3 is a plan view of the xyz stage.

FIG. 4 is an enlarged perspective view showing a slit of a stencil mask that is cut along a plane orthogonal to the length direction, and showing that it is possible to make a pattern smaller than a size of the slit.

FIG. 5 shows cross-sectional views of an xz plane showing a simplified xyz stage together with a substrate, and showing that it is possible to form a two-dimensional (XY) pattern and a three-dimensional (XYZ) pattern.

FIG. 6 is a schematic view of a pattern forming apparatus capable of forming a multi-array pattern according to a second embodiment.

FIG. 7 shows cross-sectional views of an xz plane showing a simplified xyz stage together with a substrate, and showing that the multi-array pattern is possible.

DETAILED DESCRIPTION OF EMBODIMENTS

Hereinafter, embodiments of the present disclosure are described in detail.

First Embodiment

FIG. 1 is a schematic view of a pattern forming apparatus 1 according to the first embodiment. Here, an axis direction of the pattern forming apparatus 1 may be referred to as a z-direction (or the height direction), and directions (or cross directions) orthogonal to the z-direction and orthogonal to each other may be referred to as an x-direction and a y-direction. In addition, it may be preferable that a conductive substrate is an object on which a pattern is formed. However, it is possible to form the pattern when the object is an insulator substrate sandwiched with the conductive substrates.

The pattern forming apparatus 1 may include a capillary 10, a collimating electrode 20, a primary electron coil 30, a secondary electron coil 40, an xyz stage 50, and an electromagnet 60, and these components are sequentially arranged in the z-direction. A substrate SB on which the pattern is formed may be disposed between the xyz stage 50 and the electromagnet 60.

The capillary 10 may store a solution SL and may be connected to a high-voltage power source 11 to apply a high voltage. The solution SL may preferably be a solution or solvent including a nano-sized functional polymer, biopolymer (e.g., protein or DNA), inorganic material, organic polymer, or the like as a sample.

The collimating electrode 20 may be an annular body supported by a rigid body and having a first inner diameter, and connected to a high-voltage power source 21 to apply the high voltage.

The primary electron coil 30 may be a tubular body supported by the rigid body and having an inner diameter substantially equal to the first inner diameter, and generate a first magnetic field by receiving electricity from a power source (not shown).

The secondary electron coil 40 may be a tubular body supported by the rigid body and having a second inner diameter smaller than the first inner diameter, and generate a second magnetic field by receiving electricity from the power source (not shown). In addition, the collimating electrode 20, the primary electron coil 30, and the secondary electron coil 40 have a function of concentrating the solution diffused from the capillary 10. However, this configuration may not be necessarily required for the pattern forming apparatus 1, and may be freely selected as needed.

The conductive substrate SB may be supported by the rigid body and grounded to have a ground potential. Therefore, an electrostatic field may be formed between the capillary 10 and the substrate SB.

The electromagnet 60 may be supported by the rigid body, generate a magnetic field by receiving electricity from the power source (not shown), and have a function of driving a stencil mask 54 of the xyz stage 50 in the z-direction.

Next, the description describes the xyz stage 50.

FIG. 2 is a perspective view of the xyz stage 50. FIG. 3 is a plan view of the xyz stage 50.

The xyz stage 50 may include a square-shaped large frame 51 connected to the rigid body (not shown), a square-shaped middle frame 52 disposed inside the large frame 51, a square-shaped small frame 53 disposed inside the middle frame 52, and a square plate-shaped stencil mask 54 disposed inside the small frame 53. As shown in FIG. 3, the large frame 51 may be a rectangular frame-shaped insulator coated with conductor parts CD1 to CD6 (or dark-colored portions) made of, for example, nickel, and the conductor parts CD1 to CD6 adjacent to each other in the circumferential direction may be insulated from each other by having an insulating part IS (or light-colored portion) interposed therebetween. In addition, the middle frame 52 may also be a rectangular frame-shaped insulator coated with conductor parts CD7 to CD10 (or dark-colored portions) made of, for example, nickel, and the conductor parts CD7 to CD10 adjacent to each other in the circumferential direction may be insulated from each other by having the insulating part IS (or light-colored portion) interposed therebetween. Meanwhile, the small frame 53 may have an entire circumference surrounded by a conductor part made of nickel.

A plurality of combs 51*c* and 51*d* extending to the middle frame 52 in the x-direction may respectively be connected to the conductor parts CD6 and CD3 of the side edges 51*a* and 51*b* of the large frame 51 that oppose each other in the x-direction. Meanwhile, a plurality of combs 52*c* and 52*d* extending to the large frame 51 in the x-direction may respectively be connected to the conductor parts CD10 and CD8 of the side edges 52*a* and 52*b* of the middle frame 52 that oppose each other in the x-direction.

The combs 51*c* and 51*d* and the combs 52*c* and 52*d*, made of nickel, may respectively be disposed alternately with each other while having a gap in the y-direction. The combs 51*c* and 51*d* and combs 52*c* and 52*d*, which are the combs of a first set, may form an x-direction comb type electrostatic actuator (or first actuator).

A pair of outer springs 55*a* and 55*b* may each be made of, for example, a nickel material having conductivity. Here, for convenience, as shown in FIG. 3, 55*a*(L) may refer to a left upper outer spring, 55*a*(R) may refer to a right upper outer spring, 55*b*(L) may refer to a left lower outer spring, and 55*b*(R) may refer to a right lower outer spring.

The outer spring 55*a*(L) may connect the conductor part CD1 of the side edge 51*e* of the large frame 51 that opposes the conductor part CD7 in the y-direction with the conductor part CD7 of the side edge 52*e* of the middle frame 52 that opposes the conductor part CD1 in the y-direction. In addition, the outer spring 55*a*(R) may connect the conductor part CD2 of the side edge 51*e* of the large frame 51 that opposes the conductor part CD8 in the y-direction with the conductor part CD8 going around to the side edge 52*e* of the middle frame 52 that opposes the conductor part CD2 in the y-direction.

The outer spring 55*b*(L) may connect the conductor part CD5 of the side edge 51*f* of the large frame 51 that opposes the conductor part CD10 in the y-direction with the conductor part CD10 going around the side edge 52*f* of the middle frame 52 that opposes the conductor part CD5 in the y-direction. In addition, the outer spring 55*b*(R) may connect the conductor part CD4 of the side edge 51*f* of the large frame 51 that opposes the conductor part CD9 in the y-direction with the conductor part CD9 of the side edge 52*f* of the middle frame 52 that opposes the conductor part CD4 in the y-direction.

In addition, a plurality of combs 52*g* and 52*h* extending to the small frame 53 in the y-direction may respectively be connected to the conductor parts CD7 and CD9 of the side edges 52*e* and 52*f* of the middle frame 52 that oppose each other in the y-direction. Meanwhile, a plurality of combs 53*g* and 53*h* extending to the middle frame 52 in the y-direction may respectively be connected to the side edges 53*e* and 53*f* of the small frame 53 that oppose each other in the y-direction.

The combs 52*g* and 52*h* and the combs 53*g* and 53*h*, made of nickel, may respectively be disposed alternately with each other while having a gap in the x-direction. The combs 52*g* and 52*h* and combs 53*g* and 53*h*, which are the combs of a second set, may form a y-direction comb type electrostatic actuator (or second actuator).

Outer springs 55*c* and 55*d* may also each be made of the nickel material having conductivity. The pair of outer springs 55*c* may connect the conductor part CD10 of the side edge 52*a* of the middle frame 52 that faces the side edge 53*a* in the x-direction with the side edge 53*a* of the small frame 53 that faces the conductor part CD10 in the x-direction. In addition, the pair of outer springs 55*d* may connect the conductor part CD8 of the side edge 52*b* of the middle frame 52 that faces the side edge 53*b* in the x-direction with the side edge 53*b* of the small frame 53 that faces the conductor part CD8 in the x-direction. The conductor part CD10 may be grounded through the outer spring 55*b*(L), the conductor part CD8 may be grounded through the outer spring 55*a*(R), and the small frame 53 may be grounded through the outer springs 55*c* and 55*d*.

The outer spring 55*a*(L), the left outer spring 55*b*(R), and the combs 51*c* and 51*d* may be control electrodes. In a state where the outer spring 55*a*(R) and the outer spring 55*b*(L) are grounded, a voltage may be applied from a control device (not shown) to the conductor part CD6 or CD3 to generate an electrostatic force between the combs 51*c* and 52*c* or the combs 51*d* and 52*d*. The electrostatic force may generate a driving force that relatively displaces the side edges 51*a* and 52*a* in the −x-direction (or first direction), or generate a driving force that relatively displaces the side edges 51*b* and 52*b* in the +x-direction (or first direction). The middle frame 52 may resist elastic forces of the outer springs 55*a* and 55*b* by the driving force generated by the combs 51*c* and 52*c* or the combs 51*d* and 52*d* to be displaced with respect to the large frame 51 in the x-direction together with the small frame 53 and the stencil mask 54. When no voltage is applied to the conductor part CD6 or CD3, the middle frame 52 may return to its neutral position with respect to the large frame 51 in the x-direction by the elastic forces of the outer springs 55*a* and 55*b*.

In addition, the voltage may be applied from the control device (not shown) to the conductor part CD1 or CD4 to generate the electrostatic force between the combs 52*g* and 53*g* or the combs 52*h* and 53*h*. The electrostatic force may generate a driving force that relatively displaces the side edges 52*e* and 53*e* in the −y-direction (or second direction), or generate a driving force that relatively displaces the side edges 52*f* and 53*f* in the +y-direction (or second direction). The small frame 53 may resist elastic forces of the outer springs 55*c* and 55*d* by the driving force generated by the combs 52*c* and 53*g* or the combs 52*h* and 53*h* to be displaced with respect to the middle frame 52 in the y-direction together with the stencil mask 54. When no voltage is applied to the conductor part CD1 or CD4, the small frame 53 may return to its neutral position with respect to the middle frame 52 in the y-direction by the elastic forces of the outer springs 55*c* and 55*d*.

The stencil mask 54 may be made of a nickel material having a ferromagnetic material, and include a plurality of slits 54*a* each passing therethrough in the z-direction. A through hole may be provided instead of the slit. The slit or through hole may be referred to as an opening.

A spring 56*a* formed by bending a spring steel may be disposed between a central portion of the side edge 53*a* of the small frame 53 that faces a central portion of an outer edge of the stencil mask 54 in the x-direction and the central portion of the outer edge of the stencil mask 54 that faces the central portion of the side edge 53*a*. In addition, a spring 56*b* formed by bending the spring steel may be disposed between a central portion of the side edge 53*b* of the small frame 53 that faces a central portion of an outer edge of the stencil mask 54 in the x-direction and the central portion of the outer edge of the stencil mask 54 that faces the central portion of the side edge 53*b*.

In addition, a spring 56*c* formed by bending the spring steel may be disposed between a central portion of the side edge 53*e* of the small frame 53 that faces a central portion of an outer edge of the stencil mask 54 in the y-direction and the central portion of the outer edge of the stencil mask 54 that faces the central portion of the side edge 53*e*. In addition, a spring 56*d* formed by bending the spring steel may be disposed between a central portion of the side edge 53*f* of the small frame 53 that faces a central portion of an outer edge of the stencil mask 54 in the y-direction and the central portion of the outer edge of the stencil mask 54 that faces the central portion of the side edge 53*f*. Each of the springs 56*a* to 56*d* have the same shape and may be mounted while being insulated from the stencil mask 54.

FIG. 4 is an enlarged perspective view showing the slit 54*a* of the stencil mask 54 that is cut along a plane orthogonal to the length direction, and showing that it is possible to make a pattern smaller than a size of the silt 54*a*. The stencil mask 54 is formed by sequentially laminating the following first to fourth layers in the z-direction: the first layer 54*c* formed by laminating a first insulator 54*c*1 and a first conductor 54*c*2; the second layer 54*d* formed by laminating a second insulator 54*d*1 and a second conductor 54*d*2; the third layer 54*e* formed by laminating a third insulator 54*e*1 and a third conductor 54*e*2; and the fourth layer 54*f* formed by laminating a fourth insulator 54*f*1 and a fourth conductor 54*f*2. The first layer 54*c* to the fourth layer 54*f* may each have elongated holes that are parallel and overlapped with each other in the same direction (here, the y-direction).

The elongated hole of the first layer 54*c*, which is the uppermost layer, may have the largest width, the elongated hole closer to the substrate SB may have a narrower width, and the elongated hole of the fourth layer 54*f*, which is the lowest layer, may have the smallest width. The slit 54*a* may have a stepped cross section by overlapping the elongated holes. In addition, the number of laminated layers of the stencil mask 54 is not limited to four layers.

A first voltage may be applied to the first conductor 54*c*2 of the first layer 54*c*, which is the uppermost layer, a second voltage lower than the first voltage may be applied to the second conductor 54*d*2 of the second layer 54*d*, a third voltage lower than the second voltage may be applied to the third conductor 54*e*2 of the third layer 54*e*, and a fourth voltage lower than the third voltage may be applied to the fourth conductor 54*f*2 of the lowermost fourth layer 54*f*.

As shown in FIG. 1, the electromagnet 60 may be disposed below the stencil mask 54 in the z-direction while having the substrate SB interposed therebetween. A magnetic force may be generated in the electromagnet 60 by the voltage applied from the control device (not shown), and the stencil mask 54 may be attracted toward the electromagnet 60 while resisting the elastic forces of the springs 56*a* to 56*d* by this magnetic force. As a result, the stencil mask 54 may stop at a height position where the attractive force of the electromagnet 60 and the elastic forces of the springs 56*a* to 56*d* are balanced with each other, and the height position of the stencil mask 54 may thus be adjusted by changing the voltage applied to the electromagnet 60. The electromagnet 60 may form a z-direction actuator.

(Operation of Pattern Forming Apparatus)

When a high voltage is applied to the capillary 10 from the high-voltage power source 11, the solution SL may be ejected from its tip in the form of fine droplets, and the positively charged droplet may move toward the substrate SB, which has the ground potential. Immediately after being sprayed from the capillary 10, the droplet may spread in a triangular pyramid shape to form a spray frame SF, and enter the collimating electrode 20 in this state.

A voltage supplied from the high-voltage power source 21 may be applied to the collimating electrode 20 to suppress the spread of the spray frame SF from causing the droplet to be ineffectively used for forming the pattern. Accordingly, the droplet passing through the collimating electrode 20 may proceed to be approximately parallel to the primary electron coil 30, dry rapidly in a short time during its flight, and become fine particles to enter the primary electron coil 30.

The particles passing through the primary electron coil 30 may be collected by an action of the magnetic field and head to the secondary electron coil 40 having a smaller diameter. The particles passing through the secondary electron coil 40 may be again collected by the action of the magnetic field, and reach the slit 54*a* of the stencil mask 54 of the xyz stage 50.

The slit 54*a* may become gradually narrower in a stepwise pattern from the uppermost layer to the lowermost layer, and a voltage may be applied to the conductor of each layer for the voltage to be gradually lower from the uppermost layer to the lowermost layer. Accordingly, the slit 54*a* may have an electric force line EL that is bent as if being squeezed as the line goes toward the substrate SB (see FIG. 4). In this way, the pattern may be formed smaller than a size of the slit 54*a*. The particles entering the slit 54*a* may be positively charged, thus passing through without coming into contact with an inner wall of the slit 54*a* while being collected along the electric force line EL, and be pulled to the conductive substrate SB by the electrostatic force to be deposited. As a result, a deposit having a width of the micro or nano-scale may be attached to the substrate SB without clogging the slit 54*a*.

Next, the description describes an operation of performing patterning by the pattern forming apparatus 1. FIG. 5 shows cross-sectional views of an xz plane showing the simplified xyz stage 50 together with a substrate SB, and showing steps of the patterning. For easy understanding, the stencil mask 54 here shows only the single slit 54*a*. In addition, the stencil mask 54 may stop at a predetermined distance from the substrate SB as a predetermined voltage is applied to the electromagnet 60 in an initial state.

As described above, the collected particles may pass through the slit 54*a* of the stencil mask 54, and a deposit SD1 of the collected particles may thus be attached to a predetermined position on the substrate SB (see portion (a) of FIG. 5).

Subsequently, the stencil mask 54 may be displaced by one step in the x-direction by the x-direction actuator of the xyz stage 50, and a next deposit SD2 may be attached onto the substrate SB (see portion (b) of FIG. 5) to be adjacent to the deposit SD1 (or to have a slight gap therebetween).

Subsequently, the stencil mask 54 may be displaced by one step back in the x-direction by the x-direction actuator of the xyz stage 50, and a next deposit SD3 may be attached onto the substrate SB (see portion (c) of FIG. 5) to be adjacent to the deposit SD2 (or to have a slight gap therebetween).

In this way, the patterning may be performed for the deposits SD1 to SD3 to be parallel to one another in the x-direction. In addition, the deposits may be arranged in a two-dimensional (XY) pattern on the substrate SB by displacing the stencil mask 54 in the y-direction by the y-direction actuator of the xyz stage 50 in the same sequence.

In addition, the stencil mask 54 may be raised in the z-direction by lowering the voltage applied to the electromagnet 60 when the stencil mask 54 is displaced in the x-direction or the y-direction. In this way, the stencil mask 54 may avoid interference with the deposit when moved parallel to the substrate SB in the x-direction or the y-direction. The stencil mask 54 may be displaced in the x-direction or y-direction, and the voltage applied to the electromagnet 60 may then be raised to lower the stencil mask 54 to its original position.

In addition, when a deposit is laminated on the deposit SD1, the stencil mask 54 may be displaced by the x-direction actuator or y-direction actuator of the xyz stage 50 for the slit 54*a* to be located on the deposit SD1. The stencil mask 54 may then be raised by an amount corresponding to a height of the deposit SD1 in the z-direction by lowering the voltage applied to the electromagnet 60, and a deposit SD4 may then be deposited on the deposit SD1 again (see portion (d) of FIG. 5).

In addition, when a deposit is laminated on the deposit SD4, the stencil mask 54 may be raised as much as a height of the deposit SD4 in the z-direction by continuously lowering the voltage applied to the electromagnet 60, and a deposit SD5 may then be deposited on the deposit SD4 (see portion (e) of FIG. 5). As is clear from the above description, the stencil mask 54 may be displaced to an arbitrary three-dimensional position with respect to the substrate SB by using the x-direction actuator, y-direction actuator (or cross-direction actuator), and z-direction actuator of the xyz stage 50, thereby forming a 3D printer which may arrange the deposits in a 3D (XYZ) pattern.

Second Embodiment

FIG. 6 is a schematic view of a pattern forming apparatus 1' according to the second embodiment, and showing the simplified xyz stage 50. The pattern forming apparatus 1' may form a multi-array pattern. The pattern forming apparatus 1' is different from the pattern forming apparatus 1 according to the first embodiment only in a configuration of a capillary unit 10', and the description thus omits descriptions of the common configurations.

The capillary unit 10' may include three capillaries 10C, 10M, and 10Y held in an annular body 12 rotatably supported by an actuator (not shown). The annular body 12 may form a switching device. Here, it may be assumed that the capillary 10C stores a solution including, for example, cyan-colored particles, the capillary 10M stores a solution including, for example, magenta-colored particles, and the capillary 10Y stores a solution including, for example, yellow-colored particles.

Next, the description describes an operation of performing patterning by the pattern forming apparatus 1'. FIG. 7 shows cross-sectional views of an xz plane showing the simplified xyz stage 50 together with a substrate SB, and showing steps of the patterning. Here, the stencil mask 54 may include three slits 54*a*. However, four or more slits 54*a* or tens to hundreds of holes may also be used based on a case although the number of slits 54*a* is three for easy understanding here. In addition, in an initial state, the stencil mask 54 may stop at a predetermined distance from the substrate SB.

First, the annular body 12 may be rotated for the capillary 10C to be located on an axis of a collimating electrode 20. The solution sprayed from the capillary 10C may then be dried in air to become the cyan-colored particles, and the particles may be collected by passing through the slits 54*a* of the stencil mask 54 as described above. As a result, a cyan deposit SDC may be attached onto the substrate SB (see portion (a) of FIG. 7).

Subsequently, the annular body 12 may be rotated for the capillary 10M to be located on the axis of the collimating electrode 20, and simultaneously, the stencil mask 54 may be displaced by one step in the x-direction by the x-direction actuator of the xyz stage 50. The solution sprayed from the capillary 10M may then be dried in air to become the magenta-colored particles, the particles may be collected by passing through the slits 54*a* of the stencil mask 54 as described above, and a magenta-colored deposit SDM may thus be attached onto the substrate SB to be adjacent to the deposit SDC (see portion (b) of FIG. 7).

Subsequently, the annular body 12 may be rotated for the capillary 10Y to be located on the axis of the collimating electrode 20, and simultaneously, the stencil mask 54 may be displaced by one step again in the x-direction by the x-direction actuator of the xyz stage 50. The solution sprayed from the capillary 10Y may then be dried in air to become the yellow-colored particles, the particles may be collected by passing through the slits 54*a* of the stencil mask 54 as described above, and a yellow-colored deposit SDY may thus be attached onto the substrate SB to be adjacent to the deposit SDM (see portion (c) of FIG. 7).

Subsequently, the annular body 12 may be rotated for the capillary 10C to be located on the axis of the collimating electrode 20, and simultaneously, the stencil mask 54 may be displaced by one step again in the x-direction by the x-direction actuator of the xyz stage 50. The solution sprayed from the capillary 10C may then be dried in air to become the cyan-colored particles, and the particles may be collected by passing through the slits 54*a* of the stencil mask 54 as described above, and a cyan-colored deposit SDC may thus be attached onto the substrate SB to be adjacent to the deposit SDY (see portion (d) of FIG. 7).

As is clear from the above description, the deposits SDC, SDM, and SDY may be sequentially deposited on the substrate SB repeatedly by switching between the capillaries 10C to 10Y and simultaneously displacing the stencil mask 54 by one step in the x-direction by the x-direction actuator. The stencil mask 54 may be displaced in the y-direction by the y-direction actuator when the deposition of the deposits SDC, SDM and SDY for one column is completed on the substrate SB, and the deposits SDC, SDM, and SDY for the next column may be deposited in the same way.

The deposits SDC, SDM, and SDY may be set as one set by repeating the above operation, and a plurality of sets of deposits may be multi-arrayed in two dimensions on the substrate SB to be arranged with high precision. The pattern forming apparatus 1' may be preferably used when manufacturing an organic electroluminescent (EL) display, for example.

In addition, the deposits SDC, SDM, and SDY is not limited to the periodic arrangement as described above, and may be deposited randomly by selecting the switch between the capillary 10C, 10M and 10Y), thereby combining the three primary colors to form colorful images. In addition, as in the first embodiment, a height position of the stencil mask 54 may be changed by the electromagnet 60 for the deposits SDC, SDM, and SDY may be overlapped with each other in the z-direction. In addition, the type of deposit is not limited to the color.

National R&D Project Supporting this Invention.

Project Unique Number: 2018019700

Project Number: 2018R1A6A1A0302600521

Supervising Ministry: Ministry of Education

Project Management (Specialized) Agency: National Research Foundation of Korea (NRF)

Research Program Title: University-Focused Research Institute Support Program in Science and Engineering Research Project Title: Active Printed Electronics System Using Hybrid 3D Printing Contribution Ratio: 1/1

Executing Organization: Hanbat National University Industry-Academic

Cooperation Foundation

Research Period: Mar. 1, 2021-Feb. 28, 2022

Project Identification Number 2710069013

Project Title (English): Development of continuous process technology of metal/polymer composite sheet of core components of mobility applying molecular bonding Project Managing Organization National Research Foundation of Korea Project Performing Organization Yeungnam University Industry-university Cooperation Research Period Apr. 1, 2024~Dec. 31, 2028

What is claimed is:

1. A pattern forming apparatus comprising:

a capillary facing a substrate configured to be grounded and configured to store a solution including a sample;

a power source configured to apply a voltage to the capillary;

a stencil mask disposed between the capillary and the substrate, and including an opening through which the sample passes; and a cross-direction actuator configured to move the stencil mask in a cross direction crossing a direction in which the sample passes, wherein:

the stencil mask is formed from a plurality of laminated layers, each of the plurality of laminated layers has an elongated hole, and the elongated holes overlap to form a slit having a stepped cross section that gradually narrows from an uppermost layer to a lowermost layer, and a voltage is applied to a conductor of each of the plurality of laminated layers, wherein the voltage gradually decreases from the uppermost layer to the lowermost layer, thereby forming an electric force line that is bent, such that particles entering the slit are collected along the electric force line and deposited on the substrate to form a deposit having a width smaller than a size of the slit.

2. The apparatus of claim 1, further comprising:

a stage including a large frame, a middle frame disposed within the large frame, and a small frame disposed within the middle frame, wherein the stencil mask is maintained by the small frame, a first actuator configured to displace the middle frame with respect to the large frame in a first direction, the first actuator being formed by a first set of combs respectively extending from the large frame and the middle frame, and disposed alternately with each other; and a second actuator configured to displace the small frame with respect to the middle frame in a second direction different from the first direction, the second actuator being formed by a second set of combs respectively extending from the middle frame and the small frame, and disposed alternately with each other.

3. The apparatus of claim 2, further comprising an electromagnet is disposed below the stage while having the substrate interposed therebetween, wherein the stencil mask is made of a ferromagnetic material, and the small frame and the stencil mask are connected via a spring.

4. The apparatus of claim 3, wherein the capillary is one of a plurality of capillaries, the apparatus further comprising a switching device configured to switch one of the plurality of capillaries to be positioned facing the stencil mask.

5. The apparatus of claim 2, wherein the capillary is one of a plurality of capillaries, the apparatus further comprising a switching device configured to switch one of the plurality of capillaries to be positioned facing the stencil mask.

6. The apparatus of claim 1, wherein the capillary is one of a plurality of capillaries, the apparatus further comprising a switching device configured to switch one of the plurality of capillaries to be positioned facing the stencil mask.

* * * * *